US008316905B2

(12) United States Patent
Sehlstedt et al.

(10) Patent No.: US 8,316,905 B2
(45) Date of Patent: Nov. 27, 2012

(54) PRESS AND A METHOD FOR MANUFACTURING A PRESS

(75) Inventors: Stefan Sehlstedt, Västerås (SE); Lennart Svensson, Västerås (SE)

(73) Assignee: Avure Technologies AB, Vasteras (SE)

( * ) Notice: Subject to any disclaimer, the term of this patent is extended or adjusted under 35 U.S.C. 154(b) by 1205 days.

(21) Appl. No.: 10/587,743

(22) PCT Filed: Feb. 18, 2004

(86) PCT No.: PCT/SE2004/000209
§ 371 (c)(1), (2), (4) Date: May 16, 2007

(87) PCT Pub. No.: WO2005/079966
PCT Pub. Date: Sep. 1, 2005

(65) Prior Publication Data
US 2007/0218160 A1 Sep. 20, 2007

(51) Int. Cl.
*B29C 65/02* (2006.01)

(52) U.S. Cl. ........ 156/382; 156/352; 156/381; 156/580; 425/405.2; 422/1; 422/33

(58) Field of Classification Search .................. 422/241, 422/1, 33; 92/86; 425/405.2; 156/352, 381, 156/382, 580
See application file for complete search history.

(56) References Cited

U.S. PATENT DOCUMENTS

| | | | | |
|---|---|---|---|---|
| 1,651,521 | A | 12/1927 | Girardville | |
| 2,633,414 | A | 6/1948 | Boivinet | |
| 3,472,632 | A | 10/1969 | Hervert et al. | |
| 2002/0076347 | A1 * | 6/2002 | Maerz | 422/1 |
| 2004/0004314 | A1 * | 1/2004 | Yoneda et al. | 266/249 |

FOREIGN PATENT DOCUMENTS

| | | | |
|---|---|---|---|
| DE | 22787 | A1 | 5/1985 |
| FR | 2287285 | A | 5/1976 |
| FR | 2463078 | A | 2/1981 |
| GB | 1249987 | | 10/1971 |
| GB | 1514606 | | 10/1976 |
| JP | 56-138595 | | 10/1981 |
| JP | 60-094128 | A | 5/1985 |
| WO | WO 95/21690 | A | 8/1995 |

* cited by examiner

*Primary Examiner* — Christopher Schatz
(74) *Attorney, Agent, or Firm* — Harness, Dickey & Pierce, P.L.C.

(57) ABSTRACT

An isostatic press is disclosed in which tunnel-like passages are formed between the envelope surface of a force absorbing body and a prestressing device. A method and a press are further disclosed, wherein a cylindrical element is prestressed simultaneously with obtaining a tunnel-like passage on the cylindrical element.

17 Claims, 4 Drawing Sheets

PRESS AND A METHOD FOR MANUFACTURING A PRESS

TECHNICAL FIELD

The present invention relates to an isostatic press, comprising a pressure chamber for accommodating a pressure medium, the pressure chamber being enclosed by a force-absorbing body. The invention also relates to a method of manufacturing an isostatic press.

BACKGROUND ART

Isostatic presses are used in different kinds of industry. One example is the food industry, wherein foodstuff is typically subjected to a pressure of 1000-10000 bar, such as 6000 bar, in order to inactivate micro-organisms and thereby prolong the shelf life of the foodstuff. In view of the high pressure levels used in these presses, they are commonly referred to as high-pressure presses, some of which are operable at pressures as high as 15000 bar. Isostatic presses may also be used in producing articles such as turbine blades for aircraft or artificial hip joints for implantation into persons.

An isostatic press comprises a force-absorbing pressure vessel enclosing a pressure chamber. The substances or articles to be treated are placed into the pressure chamber which is subsequently closed. A pressure medium, such as a liquid or a gas, is supplied into the pressure chamber for creating the desired pressure in the pressure chamber. The articles or substances will be affected by the pressure medium isostatically, i.e. equally from all directions. Some presses are further provided with a protective liner on the inside of the cylindrical force-absorbing pressure vessel wall, for instance in order to minimize or prevent corrosion of the pressure vessel wall.

An example of a press provided with a liner is disclosed in international patent application WO 95/21690. More specifically, the press comprises a first outer thick cylinder element of a high-tensile steel inside of which is arranged a package constituted by a thin inner safety liner and a surrounding supporting liner. A channel between the safety liner and the supporting liner provides a means of fracture indication if a fracture has occurred on the thin safety liner.

Even though the press of WO 95/21690 has many advantages, it presents a relatively complex press. The inside of the thick outer cylinder element is slightly conical in order to provide a required compressive prestress to the safety liner when it is inserted into the thick cylinder element. However, since the safety liner is a replaceable protective liner which is thin, it cannot be driven alone into the thick outer cylinder element. Therefore, the safety liner must first be inserted into the supporting liner, this liner assembly not yet being prestressed. Then the liner assembly is forced into the conical space of the thick outer cylinder element, whereby the liner assembly becomes radially prestressed. Furthermore, WO 95/21690 is limited to fracture detection of a thin liner.

SUMMARY OF THE INVENTION

An object of the invention is to provide an isostatic press which enables avoiding the conicity drawbacks of the prior art.

Another object of the invention is to provide an isostatic press which facilitates security aspects related to a force-absorbing body, such as a cylindrical wall of a pressure vessel.

Yet another object of the invention is to provide a method of manufacturing an isostatic press, which method facilitates the prestressing of a cylindrical element of the press.

A further object of the invention is to provide a method and a press with fracture indicating possibilities which are note limited to a liner.

These and other objects which will become apparent in the following are achieved by means of an isostatic press and a method as defined in the accompanied claims.

The present invention is based on the understanding that the assembling of an isostatic press having a fracture indicating function can be facilitated by allowing a prestressing means to be applied directly onto a grooved channel-forming component, instead of onto a supporting element such as the conical supporting liner in WO 95/21690 which is relatively difficult to manufacture.

This means that the present invention allows a component to be prestressed without the necessity of a supporting structure, even if said component is thin, such as a protective liner. This in turn means that an assembly step can be omitted and fewer structural details used for assembling the press.

According to a first aspect of the invention an isostatic press is provided. The press comprises a pressure chamber for accommodating a pressure medium, suitably a fluid, such as a gas (e.g. argon or some other inert gas) or a liquid (e.g. water or oil). The pressure chamber is enclosed by a force-absorbing body, which in general would be a wall (preferably cylindrical) of a pressure vessel, said wall suitably being made of a high-tensile steel. The press also comprises a prestressing means provided around an outer envelope surface of the force-absorbing body, the force-absorbing body thereby being radially prestressed. At least one tunnellike passage runs essentially over the length of said outer envelope surface of the force-absorbing body. The tunnellike passage may be straight, e.g. running in parallel with the central axis of the force-absorbing body, but may also be curved such as spiral-shaped as long as the tunnellike passage reaches from one end portion to the other end portion of said envelope surface. Said at least one tunnellike passage is defined by a groove in said outer envelope surface of the force-absorbing body and a portion of said prestressing means covering said groove. The tunnellike or covered passage serves to conduct pressure medium to a point of detection if such medium has leaked out from the pressure chamber to the outer envelope surface of the force-absorbing body. A point of detection may be on the outside of the force-absorbing body, and is suitably located on either of the ends or both ends of the press, at which point said at least one tunnellike passage may have its mouths.

This first aspect of the invention teaches in a direction quite opposite to the common practice in the art. While it has been acceptable to provide a thin liner with grooves, due to the fact that the thin liner has a surface-protecting and force-transmitting function instead of a force-absorbing function, it has previously been quite unthinkable to provide the force-absorbing body, such as the cylindrical wall of the pressure vessel, with grooves or indentations. On the contrary, it has been the general understanding of the persons skilled in the art that a force-absorbing body should be as smooth and even as possible. However, the inventors of the present invention have realized that it is in fact possible to provide the envelope surface of the force-absorbing body with grooves and still have a reliable press without any substantial dimensional changes to the force-absorbing body. This is particularly the case for relatively moderate operating pressures for which a protective liner may be omitted, though said pressures still being in the range generally referred to as high-pressure pressing. For instance, the operating pressure may be up to 6000 bar, typically 4000 bar.

The first aspect of the invention provides several advantages over prior art presses. In prior art presses, especially in those in which no liner was used inside the pressure vessels, the relatively thick force-absorbing cylindrical wall of a pressure vessel used to be inspected manually for detecting cracks. Even though cracks seldom occur in a properly dimensioned force-absorbing cylindrical wall, involuntary situations may arise which initiate the formation of cracks. For instance, scratches may occur by accident in the wall surface during e.g. loading/reloading of substances or articles to be treated in the pressure chamber. The present invention enables a press to be operated during its entire operating life without ever having to enter the inside for inspection of crack formation. Instead, if a crack is formed and is propagated so that a fracture occurs through the wall, this will be detected by pressure medium leaking out and being led by said tunnellike passages to a point of detection outside the press. Also, using the prestressing means to form the tunnellike passage enables a gentle and time efficient prestress of the force-absorbing body.

According to a second aspect of the invention a method of manufacturing an isostatic press is provided. The method comprises providing a cylindrical element comprising an inner surface defining a pressure treatment chamber for accommodating a pressure medium and an outer envelope surface. The outer envelope surface is provided with at least one groove running essentially over the length of said outer envelope surface. The method further comprises applying a single prestressing means on said outer envelope surface for inducing a compressive radial prestress in said cylindrical element and simultaneously creating at least one tunnellike passage defined by said groove and a portion of said prestressing means covering said groove.

Thus, the present invention enables the manufacturing of an isostatic press with tunnellike passages by only applying a single prestressing means instead of the prior art having two, namely the windings and the conical element. In this connection it should be explained that a single prestressing means is to be understood to include the use of several prestressing wires or bands which are conventionally wound around the cylinder element.

Thus, by applying the prestressing means onto the envelope surface of the cylindrical element and simultaneously creating the fracture indicating tunnellike passage, a time efficient method is achievable. For instance, the prestressing means may be wire-shaped or band-shaped and be wound around the envelope surface of the cylindrical element. As it is wound around and along the length of the envelope surface it will gradually cover the groove and form the tunnellike passage. Alternatively, the prestressing means may be cylinder-shaped and be shrunk on said envelope surface. This latter alternative can suitably be achieved by heating the prestressing means so that it expands and so that said cylindrical element is introduceable inside the prestressing means, and as the prestressing means cools down it grips the envelope surface of the cylindrical element tightly, thereby obtaining the tunnellike passages simultaneously with the prestress of the cylindrical element. Alternatively, the cylindrical element is cooled down and as it gets warmer and expands, the cylinder-shaped prestressing means grips the envelope surface of the cylindrical element. It should be noted that even though according to the second aspect of the invention a single prestressing means is applied on said envelope surface for inducing a compressive radial prestress in said cylindrical element and simultaneously creating said tunnellike passage, this does not exclude a subsequent provision of prestressing bands or wires on the outside surface of the cylinder-shaped prestressing means.

The synergetic effect of the second aspect of the invention is applicable to the case wherein said cylindrical element is a force-absorbing body as discussed above for the first aspect of the invention, and suitably the force-absorbing body being a cylindrical wall of a pressure vessel. However, the method according to the second aspect of the invention can also be used for prestressing a protective liner. In this latter case said prestressing means is suitably a surrounding concentric force-absorbing cylindrical wall of a pressure vessel which is made to shrink on the outer envelope surface of the protective liner. Thus, inventive method enables the manufacturing of a press having a pressure vessel with inherent fracture detection, i.e. a true “leak before burst” function, and it also enables a simplified prestressing of a liner without needing a supporting structure and without needing to be driven into a conically shaped space (generally a cylindrical space is easier to accomplish than a conical space).

Similarly to the method in said second aspect of the invention, an isostatic press is provided in accordance with a third aspect of the invention. Correspondingly to said method, this isostatic press comprises a cylindrical element on which a single prestressing means is provided for inducing a radial prestress in the cylindrical element, and at least one tunnellike passage defined by a groove in the outer envelope surface of the cylindrical element and a portion of said prestressing means covering said groove.

From the above it should now be clear that the invention accomplishes several advantages by arranging the tunnellike passages directly between an envelope surface and a prestressing means.

The cross-section of the tunnellike passage may be chosen from any suitable alternative. For instance, it may be in the form of a closed semicircle, wherein the grooved envelope surface provides the curved portion of the semicircle and the prestressing means provides the straight closing portion that connects the ends of the semicircle. Suitably, the prestressing means will generally be in contact with non-grooved portions in between grooved portions of the outer envelope surface, such as in the form of wires or bands abutting or lying against the non-grooved portions or in the form of a shrunk cylinder engaging the non-grooved portions, thereby covering the grooved portions and forming a hollow passageway. Any alternative cross-sections, such as semi-elliptical or semi-rectangular are possible as long as they are suitable as regards material strength aspects. Regardless of which cross-section is chosen for the tunnellike passage, the area of said cross-section is suitably dimensioned to conduct a flow of pressure medium, i.e. volume per time unit, e.g. essentially equal to or larger than the flow of pressure medium supplied into the pressure chamber by a pumping device. This ensures that, in case of a fracture, the pressure acting on the fracture or crack will not increase, thereby reducing the risk of burst of the cylindrical element, liner or pressure vessel. Alternatively, the dimensioning of the tunnellike passage may be such that a lower flow of pressure medium is conducted than the flow of pressure medium supplied into the pressure chamber. Merely as an example, the grooves may have a depth and radius of a couple of millimeters, such as 1-2 mm when provided on the envelope surface of a pressure vessel wall which has a typical thickness in the range of 30 mm-100 mm.

The tunnellike passage or passages, having a starting point and an end point at opposite end portions of the envelope surface, may run along different paths. For instance a tunnellike passage may be in the form of a straight line extending in parallel to the longitudinal axis of a cylinder or pressure vessel wall. Alternatively, it may follow the envelope surface in different angles to said longitudinal axis. It would even be possible to have at least some portions of a tunnellike passage at 90 degrees to said longitudinal axis, which would e.g. be in the form of one or several parallel circles arranged around the envelope surface and one or more connecting portions allowing fluid to flow from one circle to another all the way to a point of detection at one end of the press. According to at least one advantageous embodiment of the invention, said at least one tunnellike passage runs in the form of a spiral around said outer envelope surface and essentially along the whole of its length. In this manner a large part of the surface will be provided with fracture indicating means, and a continuous groove can be easily provided. Due to the spiral shape a fracture may be detected all around the envelope surface.

Advantageously, in order to ensure the ability to detect a fracture, the press suitably is arranged with at least two tunnellike passages, optionally even more. This provides the advantage that, in case one of the tunnellike passages is clogged and the flow of pressure medium becomes obstructed in that passage, another passage may still be unobstructed and be able to lead the pressure medium to a point of detection. Suitably, said two tunnellike passages are interconnected by some type of cross-passage, such as a passage that passes through both said two passages at one or more locations.

Said at least two tunnellike passages may have similar dimensions and extend along similar paths or on the contrary be different, e.g. in the form of a cross-passage as explained above.

In order to achieve good area coverage of said at least tunnellike passages, and to enable a relatively quick detection of any leakage said tunnellike passages may run in parallel with each other in the form of spirals around said outer envelope surface. This means that the distance the pressure medium will travel from the fracture to the point of detection can, for the same envelope surface area coverage, be halved if there are two helical parallel tunnellike passages instead of just one. If there are even more, such as for instance sixteen, the traveled distance will be even shorter (sixteen times shorter). Suitably, also said at least two helical tunnellike passages are intersected by at least another cross-passage that enables pressure medium to flow from one tunnellike passage to another tunnellike passage. Said cross-passage may be short and interconnecting the tunnellike passages at one or more defined locations, or may be in the form of a long tunnellike passages which runs from one end portion to the other end portion of the envelope surface. Advantageously, said at least two helical tunnellike passages comprise grooves running in parallel with each other in the form of spirals inclined in one direction relative to the circumference of said outer envelope surface, while at least one other groove runs in the form of a spiral inclined in the opposite direction relative to the circumference of said outer envelope surface, thereby intersecting said plurality of grooves. The corresponding oppositely directed grooves may also be provided on an envelope surface having only two grooves in total, wherein one groove would have a clockwise path and the other one an anti-clockwise path.

The groove or grooves should be dimensioned in such manner that, when a crack has propagated through the wall and grown so that it opens into a groove, then the crack must not have reached the so called critical size. The critical size is determined by the formula $K=f\cdot\sigma\sqrt{\pi\cdot a}$, wherein K is the stress intensity [$MPa\cdot m^{1/2}$], f is a geometrical factor [-], $\sigma$ is the tensile stress [MPa] and a is crack depth [m]. If there is a crack in a construction material and the construction material is subjected to the tensile stress a the above formula applies. When the stress intensity K reaches a critical value $K_c$, the crack growth is instable. The critical value $K=K_c$ is a material property and is generally referred to as fracture toughness.

DETAILED DESCRIPTION OF THE DRAWINGS

Figure 1:
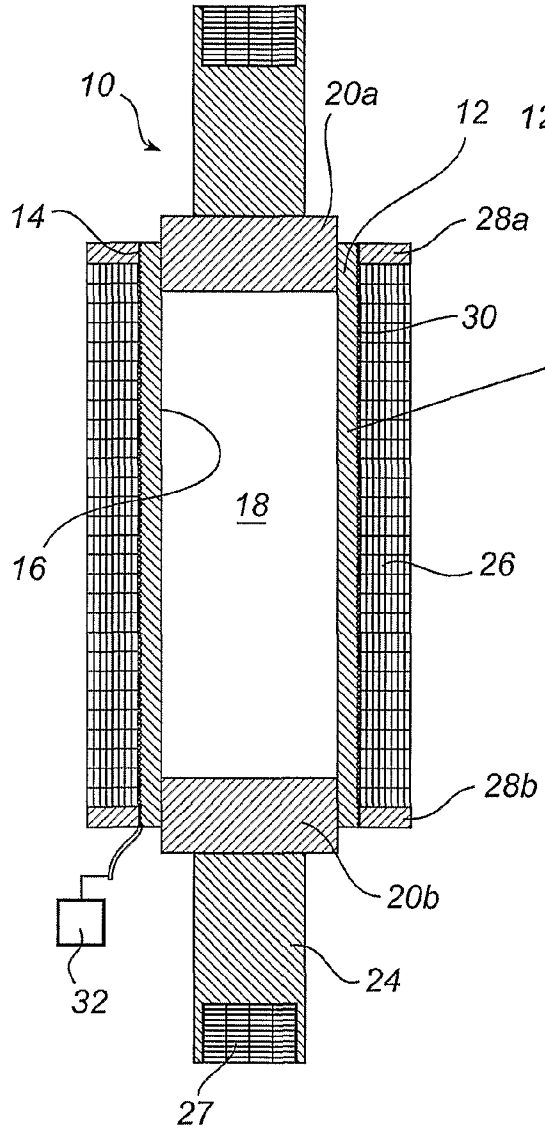
FIG. 1 is a schematic cross-sectional view of an isostatic press in accordance with at least one embodiment of the invention.

FIG. 1 is a schematic cross-sectional view of an isostatic press 10 in accordance with at least one embodiment of the invention. The press 10 comprises a generally cylindrical pressure vessel-forming wall 12 having an outer envelope surface 14 and an inner surface 16. The inner surface 16 defines a generally cylindrical delimitation of a pressure chamber 18 in which substances are to undergo pressure treatment. The pressure chamber 18 is also delimited by two end closures 20*a*, 20*b*.

Substances are introduced into the pressure chamber 18 by removing one of the end closures 20*a* or 20*b*. Next, the end closure 20*a* or 20*b* is returned into place and a pressure medium, such as water, is supplied from a pump through conduits (not illustrated) leading into the pressure chamber 18, e.g. via one of the end portions of the isostatic press 10. When the pressure chamber 18 is filled with pressure medium, more pressure medium is introduced in order to increase the pressure to a desired high-pressure state. When the treatment is finished, the pressure chamber 18 is decompressed and the end closure 20*a* or 20*b* is removed so that the treated substances can be taken out from the pressure chamber 18, and thereby allowing new substances to be introduced.

In order to assist the pressure vessel 12 in taking up axial loads the press 10 is provided with a surrounding force-absorbing frame 24.

In order to assist the pressure vessel wall 12 in taking up radial loads, the outer envelope surface 14 thereof is provided with a prestressing means in the form of a package of wound steel bands 26. The bands 26 are wound tightly, substantially in circles, around the envelope surface 14 so as to provide a radial compressive prestress in the pressure vessel wall 12. The band package 26 has a longitudinal extension essentially equal to the length of the pressure chamber 18, i.e. the distance between the end closures 20*a*, 20*b*, and is delimited by two collars 28*a*, 28*b* arranged in respective circumferential recesses. As illustrated in the figure, the frame 24 may also be provided with a package of wound steel bands 27.

The outer envelope surface 14 of the pressure vessel wall 12 is provided with cut helical grooves 30 that are shielded with the prestressing band package 26. Should a fracture occur through the pressure vessel wall 12 and reach the grooves 30, pressure medium will be guided by the tunnels formed by the grooves and bands to a point of detection 32, at which point the pressure medium is detected. Even though only one point of detection 32 is indicated in the figure, several may be provided, e.g. one at each end portion of the press. The point of detection may comprise a valve connected to any alarm device which when water is detected produces an alarm signal, such as an audio, optical, electrical, mechanical or other type of alarm signal. Alternatively, the valve may be omitted.

Figure 2:
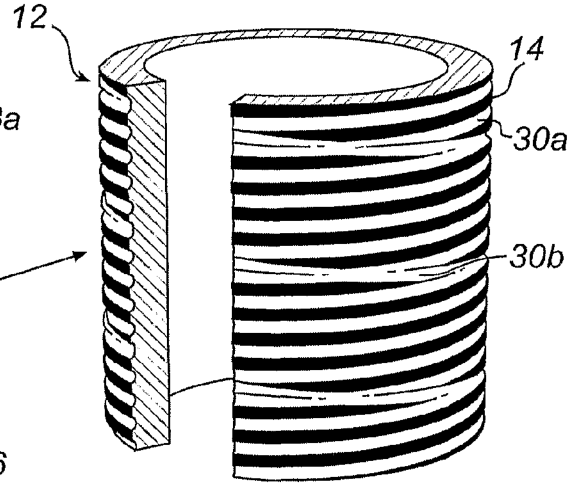
FIG. 2 is a cut out detailed perspective view of a pressure vessel wall provided in the press shown in FIG. 1.

FIG. 2 shows a cut out portion of the pressure vessel wall 12 in more detail, the dimensions of the grooves in the figure being somewhat exaggerated for the sake of clarity. The outer envelope surface 14 of the pressure vessel wall 12 is provided with two helical grooves 30*a*, 30*b* for forming two tunnellike passages. The first helical groove 30*a* has a relatively small pitch and is inclined in one direction. The second groove 30*b* has a relatively large pitch and is inclined in the opposite direction. The first groove 30*a* runs about six revolutions around the outer envelope surface 14 for each revolution of the second groove 30*b*. If the first groove 30*a* is clogged somewhere along its path, thereby obstructing the flow of leaked pressure medium, the second groove 30*b* will provide a bypass enabling the pressure medium to flow to the point of detection through the tunnellike passage associated with the second groove 30*b*. Alternatively, once it has bypassed the obstruction, the pressure medium will return to the tunnellike passage associated with the first groove 30*a*. Yet another alternative is that both the first groove 30*a* and the second groove 30*b* will simultaneously conduct pressure medium to a point of detection.

Figure 3:
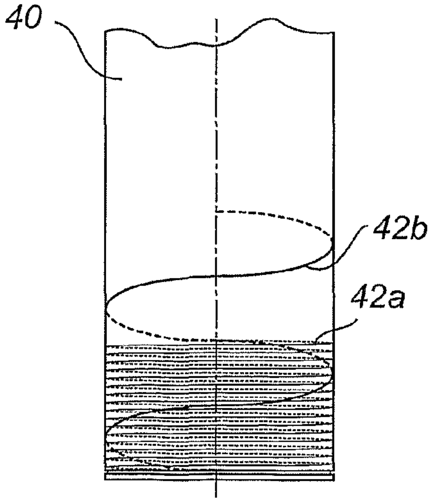
FIG. 3 is a schematic side view of an alternative outer envelope surface of a pressure vessel wall.

FIG. 3 is a schematic side view of an alternative pressure vessel wall 40. This pressure vessel wall 40 is, similarly to the pressure vessel wall shown in FIG. 2, provided with a first helical groove 42*a* and a second helical groove 42*b*. In order to clearly see the pitch and inclination of the grooves 42*a*, 42*b* only a short portion of the pressure vessel wall is shown to have grooves, however, it is to be understood that they extend essentially all the way from one end to the other end of the cylindrical pressure vessel wall 40. Just like in the previous figure, the first groove 42*a* and the second groove 42*b* are of different hand, i.e. when viewing the grooves from one end of the pressure vessel wall 40 and following their paths towards the other end, one of the grooves will have a clockwise path and the other one of the grooves will have an anti-clockwise path. The pitches of the first groove 42*a* and the second groove 42*b* is such that the first groove 42*a* makes sixteen revolutions for each revolution of the second groove 42*b*.

Figure 4:
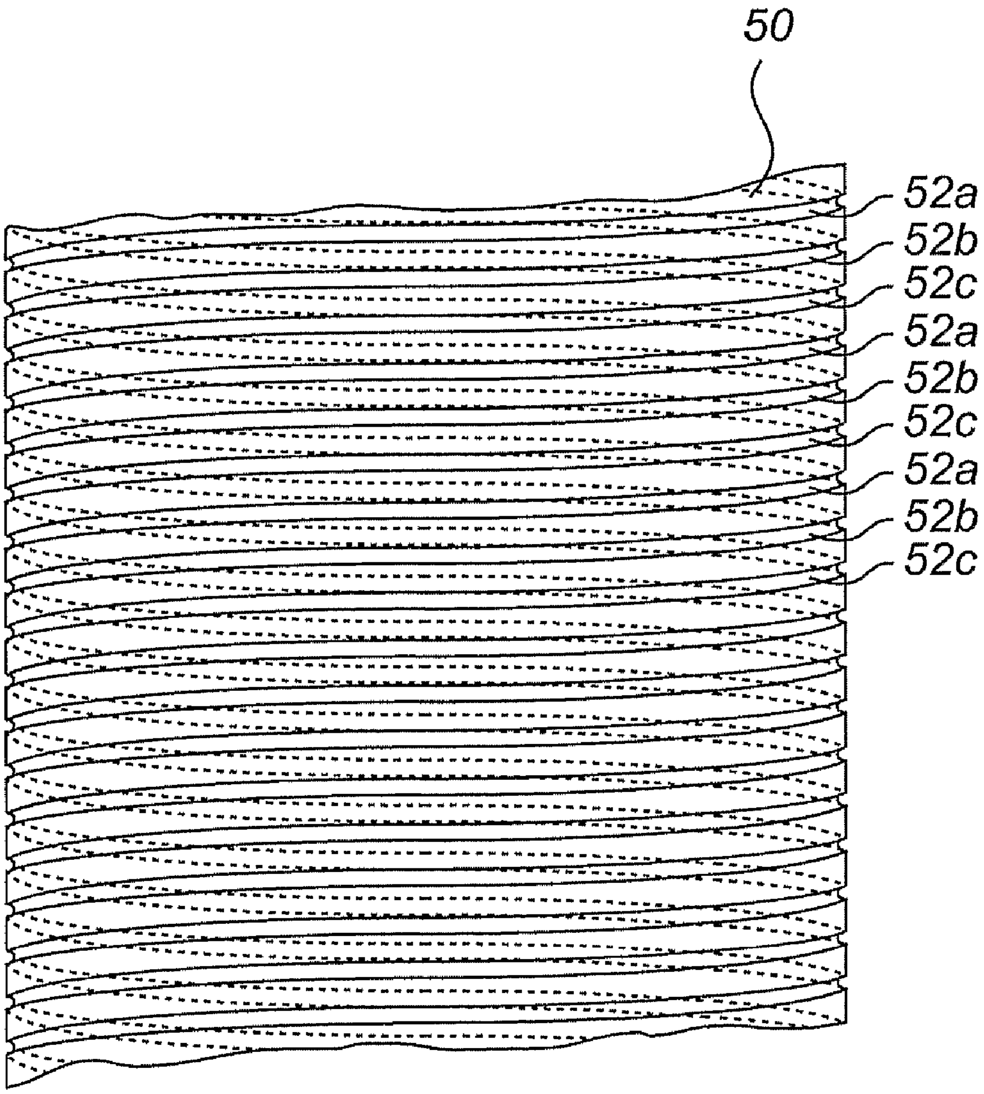
FIG. 4 shows schematically a portion of another alternative outer envelope surface of a pressure vessel wall.

FIG. 4 shows schematically a portion of another alternative outer envelope surface 50 of a pressure vessel wall. In contrast to the previous figures, the present figure illustrates three parallel helical grooves 52*a*, 52*b*, 52*c* having equal pitch. Even though not illustrated in FIG. 4, the envelope surface 50 may, just like any envelope surfaces, be provided with another groove which is inclined in the opposite direction (as in FIGS. 2 and 3). Instead of having one long groove in the form of a spiral along the envelope surface, the envelope surface 50 shown in FIG. 4 has three shorter grooves, i.e. each groove 52*a*, 52*b*, 52*c* has a three times shorter helical path around the envelope surface compared with the case in which only one groove is used (provided said one groove has a three times smaller pitch). This type of triple-grooved embodiment can cover essentially the corresponding area of the envelope surface as a single-grooved embodiment by dimensioning the distance between two neighboring grooves to be the same as the pitch of the single-grooved embodiment. An advantage is a possibly faster detection of fracture due to the shorter distance to be traveled by leaked pressure medium.

Figure 5C:
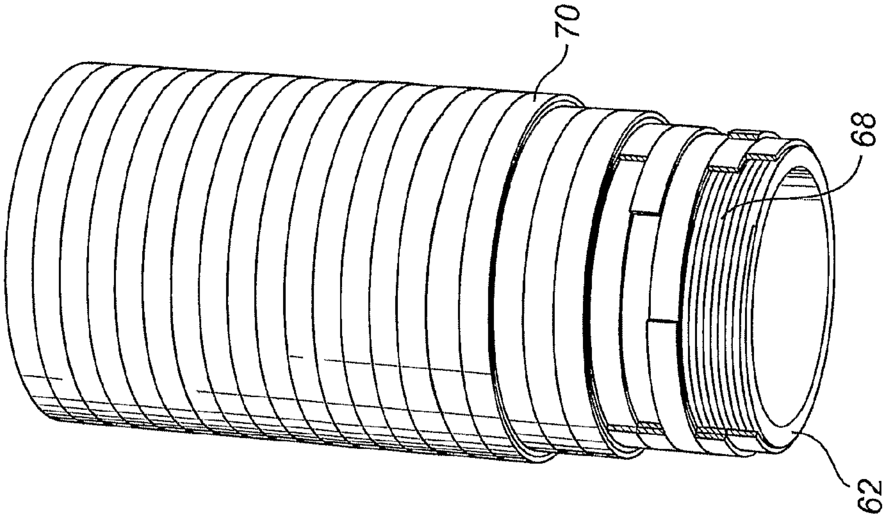
FIGS. 5*a*-5*c* schematically illustrate a manufacturing method related to at least one embodiment of the present invention.
Figure 5B:
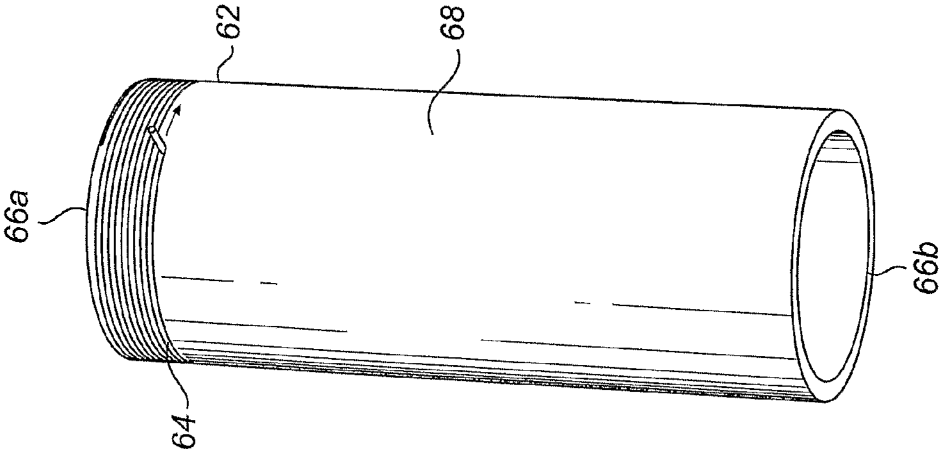
Figure 5A:
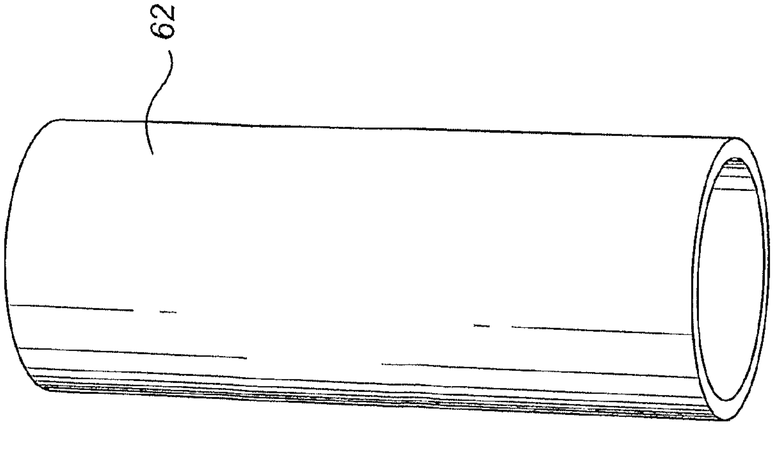

FIGS. 5*a*-5*c* schematically illustrate a manufacturing method related to at least one embodiment of the present invention. A cylindrical element 62 is provided in FIG. 5*a*, the intended use of which may be a resulting cylindrical force-absorbing wall of a pressure vessel if the material is of a high-tensile steel. An alternative use may be a relative thin protective liner essentially without any force-absorbing properties. The cylindrical element is subsequently provided with at least one groove 64, suitably helical as illustrated in FIG. 5*b*. The groove 64 is achieved e.g. by cutting or milling or any other suitable technique. If a helical groove is provided as illustrated in FIG. 5*b* it will start its path at one end 66*a* of the cylindrical element and, after a plurality of revolutions around the circumference of the envelope surface 68 of the cylindrical element, end its path at the other end 66*b*. Next, a prestressing means 70 is applied directly onto the now grooved envelope surface 68 so as to accomplish the forming of a tunnellike passage simultaneously with prestressing the cylindrical element 62. In FIG. 5*c* the prestressing and forming of the tunnellike passage is illustrated with winding of steel bands 70 around the grooved envelope surface 68 of the cylindrical element 62. Instead of relatively broad bands 70 it is possible to use relatively thinner steel wires. As illustrated, the steel bands 70 may be wound in several layers and can be wound helically with a small pitch around the circumference of the grooved envelope surface 68 of the cylindrical element 62. If the length of the steel band 70 available is shorter than the desired length for obtaining a finished prestressed cylindrical element 62, the ends of two steel bands may be joined and the winding may then be continued. Thus, this illustrated manufacturing method provides tunnellike passages in an easy manner and in a favorable geometry, making it possible to avoid extra supporting means and conical geometries.

Figure 6:
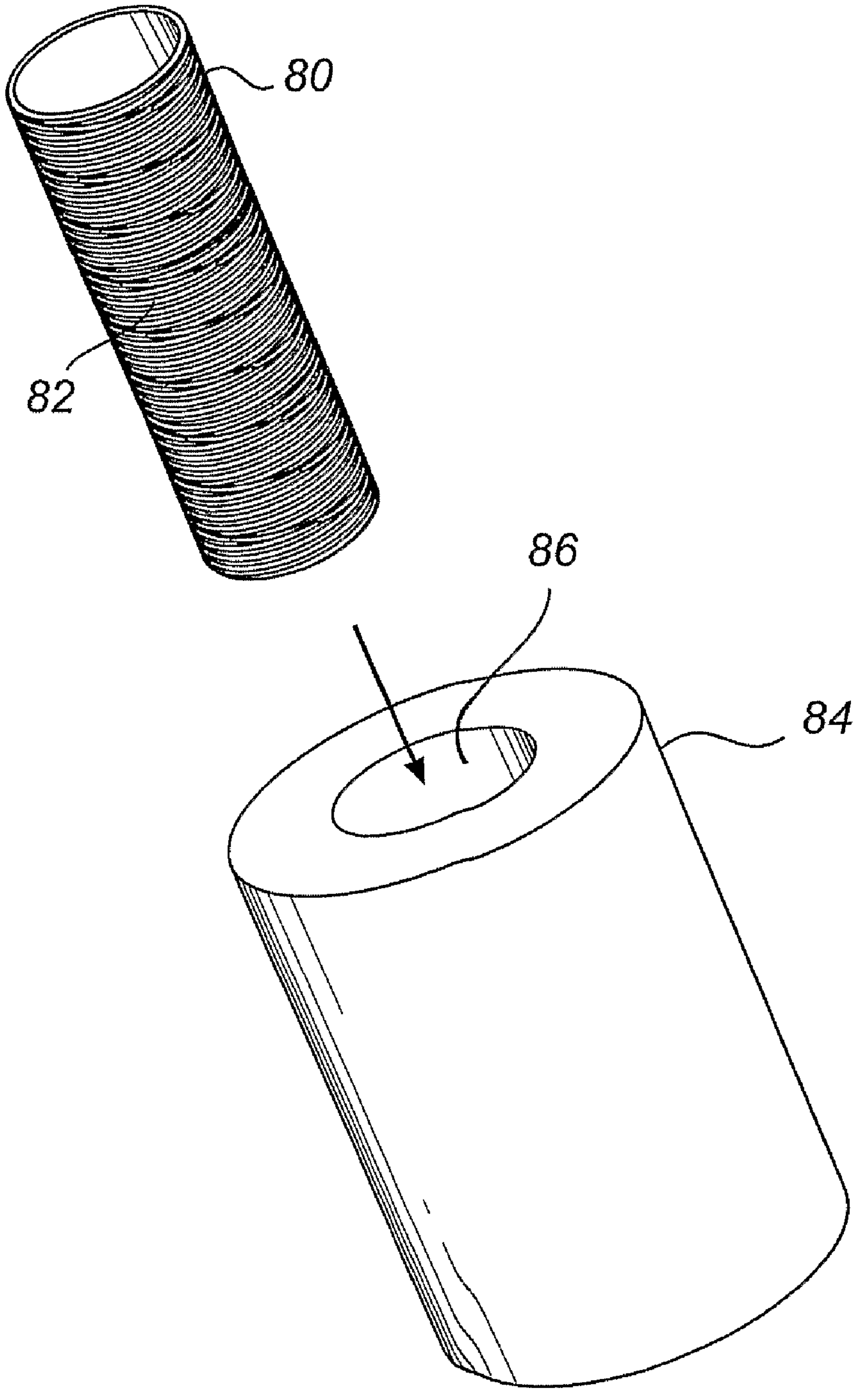
FIG. 6 schematically illustrates at least one other embodiment in accordance with the present invention.

FIG. 6 schematically illustrates at least one other embodiment in accordance with the present invention. A thin protective liner 80 is illustrated with grooves 82 in accordance with the previous description, e.g. grooves of the type shown in FIG. 2. Also shown in FIG. 6 is a considerably thicker cylindrical element 84 adapted to function as a force-absorbing wall of a pressure vessel. This thicker force-absorbing wall 84 is heated to a determined temperature and thereafter the liner 80 is inserted into the tubular space 86 defined by the cylindrical force-absorbing wall 84. There may be a close fit between the liner 80 and the concentrically surrounding thick force-absorbing wall 84, however, none of them being in a prestressed condition yet and the tunnellike passages not being fully formed. As the thicker outer wall 84 cools down, it will shrink on the liner 80 and provide a radially directed compressive load on the envelope surface of the liner 80, the liner 80 thereby becoming radially prestressed. Note, that similarly to the prestressing illustrated in FIGS. 5*a*-5*c*, the prestressing in FIG. 6 occurs simultaneously with the attainment of tunnellike passages, the tunnellike passages being formed as the thick wall 84 during cooling grips the envelope surface of the liner 80. It should be noted that even though this means of prestressing has been shown in connection with a liner, the corresponding measures may be taken to prestress a grooved force-absorbing pressure vessel wall by shrinking on an external cylindrical prestressing means. Furthermore, it should be noted that the inner element, such as the liner 80, may as an alternative be cooled down and as it gets warmed up it expands an becomes radially prestressed by the surrounding element, such as the wall 84.

It should now have been made clear from the above description that the present invention provides a simple and yet effective press and method, while the drawbacks of the prior art are avoided. It should, however, be noted that even though the present invention enables other more advantageous configurations than the conical configuration of the prior art, such conical configuration is not excluded from the scope of the invention. Also, even though at least one aspect of the invention provides for the pioneering fracture indication of an actually force-absorbing body, preferably a pressure vessel wall, the combination of fracture indication of a non-force absorbing body is not excluded. For instance, in line with at least one embodiment of the invention, a press comprising a pressure vessel wall provided with the inventive tunnellike passages may also have a protective liner with fracture indicating means. Furthermore, the invention is not limited to the prestressing means described. On the contrary the invention covers the general concept of providing a tunnellike passage with the prestressing means being one of the tunnel-forming components. Likewise the invention covers a general production of a tunnellike passage wherein it is formed simultaneously with the prestressing of a tunnel-forming component. Moreover, even though the cylindrical element, pressure vessel wall and isostatic press have been shown in an upright vertical position, the invention is also applicable to horizontally lying isostatic presses, cylindrical elements and pressure vessels.

The invention claimed is:

1. An isostatic press, comprising:

a pressure chamber for accommodating a pressure medium, the pressure chamber being enclosed by a radially prestressed force-absorbing body having an inner surface being in direct contact with a pressure medium when the pressure chamber is filled with pressure medium;

a final prestressing device, provided around an outer envelope surface of the force-absorbing body for providing the final radial prestress in the force-absorbing body; and at least one tunnel-like passage running essentially over the length of said outer envelope surface of the force-absorbing body, the tunnel-like passage being defined by a groove in said outer envelope surface of the force-absorbing body and a portion of said prestressing device covering said groove, for conducting pressure medium to a point of detection if such medium has leaked out through said force-absorbing body from the pressure chamber to the outer envelope surface of the force-absorbing body.

2. An isostatic press, comprising:

a cylindrical element comprising an inner surface defining a pressure treatment chamber for accommodating a pressure medium and an outer envelope surface;

a single final prestressing device provided around said outer envelope surface of the cylindrical element, for inducing the final radial prestress in the cylindrical element; and at least one tunnel-like passage running essentially along said outer envelope surface of the cylindrical element, the tunnel-like passage being defined by a groove in said outer envelope surface of the cylindrical element and a portion of said final prestressing device covering said groove, for conducting pressure medium to a point of detection if such medium has leaked out from the pressure chamber to the outer envelope surface of the cylindrical element.

3. The isostatic press as claimed in claim 1, wherein said force absorbing body is a cylindrical wall of a pressure vessel.

4. An isostatic press as claimed in claim 2, wherein said cylindrical element is a force-absorbing cylindrical wall of a pressure vessel.

5. An isostatic press as claimed in claim 2, wherein said cylindrical element is a protective liner and said prestressing device is a surrounding concentric force-absorbing cylindrical wall of a pressure vessel, wherein the cylindrical wall is shrunk on the outer envelope surface of the protective liner.

6. The isostatic press as claimed in claim 1, wherein said prestressing device is at least one of wire-shaped and band-shaped and is wound around said outer envelope surface.

7. The isostatic press as claimed in claim 1, wherein said prestressing device is cylindrical and is shrunk on said outer envelope surface.

8. The isostatic press as claimed in claim 1, wherein the cross-sectional area of the tunnel-like passage is dimensioned to conduct a pressure medium flow essentially equal to or larger than the flow of pressure medium supplied into the pressure chamber by a pumping device.

9. The isostatic press as claimed in claim 1, wherein the cross-sectional area of the tunnel-like passage is dimensioned to conduct a pressure medium flow lower than the flow of pressure medium supplied into the pressure chamber by a pumping device.

10. The isostatic press as claimed in claim 1, wherein said at least one tunnel-like passage runs in the form of a spiral around said outer envelope surface and essentially along the whole of its length.

11. The isostatic press as claimed in claim 1, wherein the press comprises at least two tunnel-like passages running essentially along said outer envelope surface, each tunnel-like passage being defined by a respective groove in said outer envelope surface and a portion of said prestressing device covering said groove.

12. The isostatic press as claimed in claim 11, wherein at least two of said tunnel-like passages run in parallel with each other in the form of spirals around said outer envelope surface and essentially along the whole of its length.

13. The isostatic press as claimed in claim 11, wherein at least one groove intersects at least another groove, thereby enabling pressure medium to flow from one tunnel-like passage to another tunnel-like passage.

14. The isostatic press as claimed in claim 13, wherein at least one first groove runs in the form of a spiral inclined in one direction relative to the circumference of said outer envelope surface, and at least one second groove runs in the form of a spiral inclined in the opposite direction relative to the circumference of said outer envelope surface, thereby intersecting said at least one first groove.

15. The isostatic press as claimed in claim 11, wherein the groove is dimensioned and arranged along said outer envelope surface in such manner that, when a crack has propagated through the wall and grown so that it opens into a groove, the crack must not have reached a critical size.

16. The isostatic press as claimed in claim 1, wherein the force-absorbing member forms the pressure chamber, the prestressing device is in direct contact with the outer surface of the force-absorbing body and a portion of the prestressing device is in direct contact with portions of the outer envelope surface that form the groove.

17. The isostatic press as claimed in claim 2, wherein a single prestressing device is directly on the outer envelope surface of the cylindrical element.

* * * * *